Jan. 26, 1960

W. F. DEHN ET AL

CAPACITOR ASSEMBLY

Filed Sept. 12, 1955

2,922,936

INVENTORS
William F. Dehn
Robert J. Hower
Heinz M. Schlicke
BY
Arthur H. Seidel
ATTORNEY United States Patent Office 2,922,936
Patented Jan. 26, 1960

2,922,936

CAPACITOR ASSEMBLY

William F. Dehn, Wauwatosa, Robert S. Hower, Whitefish Bay, and Heinz M. Schlicke, Fox Point, Wis., assignors to Allen-Bradley Company, Milwaukee, Wis., a corporation of Wisconsin Application September 12, 1955, Serial No. 533,789

5 Claims. (Cl. 317—242)

Figures 1, 2, 3:
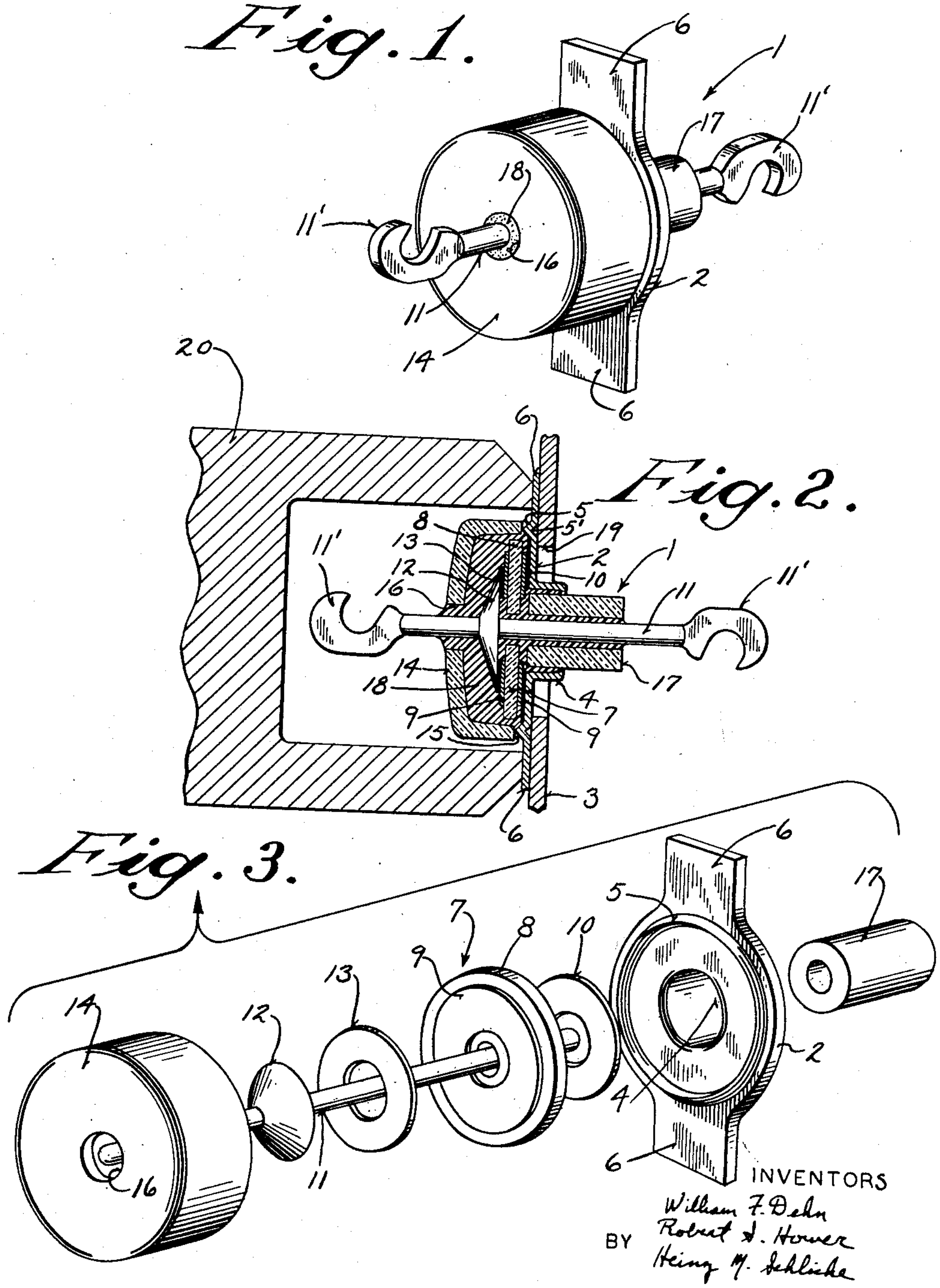

This invention relates to capacitors employed in electrical circuit networks for providing a capacitance between circuit conductors and shielding or chassis members associated with such networks, and it more specifically resides in a capacitor assembly having a capacitor unit proper comprising a flat disc-like dielectric with plates on opposite sides of the disc, in which one of the plates is connected with a mounting piece having heat receiving tab portions adapted to be readily secured to a shielding or chassis member, and the other plate is connected to a conductor extending transverse of the capacitor assembly, which conductor is rigidly held by a composite protective insulating covering that comprises a hard shell and a heat hardened bedding layer adhering the shell with the other components.

It has become desirable to construct special capacitors for electronic circuit networks that are adapted to provide capacitance between conductors and shielding or chassis members associated with the circuits. A typical application occurs in passing a power supply conductor through shielding for a high frequency circuit. It is essential to prevent high frequency stray currents from passing from the shielded area, and to achieve this end a capacitance is inserted between the conductor and the shielding. The capaictance acts to pass the high frequency from the conductor to the shielding, while blocking the low frequency currents carried by the conductor. For this application the capacitor employed should present a small impedance over the full range of high frequency, to ensure adequate passage of all currents of these frequencies. Heretofore, usage has been made of tubular capacitors. These, however, exhibit inductance which presents undesirable impedance for the higher frequencies encountered. Therefore, they do not adequately pass high frequency current. In the present invention a discoidal capacitor unit is employed which decreases inductive reactance to a minimum, and superior, low impedance characteristics are thus obtained.

The applications for discoidal capacitors, constructed in accordance with the invention, include numerous commercial constructions of electronic equipment wherein the capacitors are used in large quantity production. It is preferable that these capacitors be constructed in a form that permits ready insertion into, or assembly with, a shielding or chassis member, and also that the construction be sturdy to withstand handling in mass production, contact with soldering irons, and thermal shocks incurred in soldering operations.

In the practice of this invention a capacitor assembly is provided that includes a mounting piece from which extends exposed heat receiving mounting tab areas. The tab areas are adapted to be placed against a shielding or chassis member, and then contacted by a soldering iron to receive and conduct heat for the solder connection to be made. The tab areas are exposed for ready engagement by the soldering iron, and the ease and rapidity with which the capacitor assembly may consequently be mounted greatly facilitates assembly of circuit networks.

For economical handling of circuit components, in the assembly of circuits, the components must be taken from a source of supply, positioned and fastened in place within a few seconds. Otherwise the cost of the operation becomes excessive. The presentation of the exposed heat receiving tab portions of the present invention augments assembly to decrease production expense, and thereby presents a marked advance over capacitor assemblies lacking exposed elements adapted to be placed against a shielding or chassis on one side and to receive heat on the other.

Apparatus of the invention also presents a sturdy construction that will withstand abuse without damage to the fragile capacitor elements. A shell of hard protective material is placed about both the capacitor unit proper and portions of the conductor attached to one of the capacitor plates. A heat hardenable bedding material is disposed in the space between the shell and the other elements to unite the same into a composite assembly exhibiting a hard covering of insulating material for the capacitor unit that holds the associated conductor rigid. The covering also provides electrical insulation of high dielectric strength able to withstand adverse humidity and heat as well as physical impact.

For the bedding material it has been found that epoxy resin has particularly desirable characteristics. Such a resin, when liquid, readily wets surfaces to ensure adhesion over the entire surface areas to be joined thereby. It also exhibits adequate resistance to heat and humidity whereby apparatus of the invention may be subjected to the more severe conditions to which electronic circuits are exposed without adversity. Epoxy resin also exhibits requisite adhesion for an intermediary bedding material.

It is an object of this invention to provide a capacitor assembly that may be readily fastened to a shielding or chassis member to provide a bypass capacitance between a circuit conductor and the shielding or chassis.

It is another object of this invention to provide a capacitor assembly that may be soldered to a shielding or chassis member in a minimum of time to facilitate production of electronic circuit systems.

It is another object of this invention to provide a capacitor assembly adapted for integral connection with a chassis having an insulating covering encircling electrical elements that imparts high mechanical strength to the assembly.

It is another object of this invention to provide a capacitor assembly having insulation that will withstand adverse heat and humidity conditions.

These and other objects and advantages of this invention will appear in the description to follow. In the description reference is made to the accompanying drawing, which forms a part hereof, and in which there is shown by way of illustration and not of limitation a specific form in which the invention may be embodied.

In the drawing:

Fig. 1 is a view in perspective of a capacitor assembly embodying the invention, Fig. 2 is a view in cross section of the capacitor assembly shown in Fig. 1 and of the tip of a soldering iron employed to mount the assembly in place, and Fig. 3 is an exploded view in perspective of elements in the capacitor assembly.

Referring now to the drawing, there is shown in Figs. 1 and 2 a capacitor assembly 1 which has a metallic conductive mounting piece 2. The mounting piece 2 is substantially flat to provide a surface that may be placed against a metallic sheet 3 to which the assembly 1 is to be mounted, as is shown in Fig. 2.

The mounting piece 2 is formed with a centrally located neck 4 that defines a central opening, and spaced radially inward from the outer periphery of the piece 2 is a circular ridge 5 that is substantially concentric with the neck 4. The ridge 5 serves the dual purpose of aligning parts to be joined together and to present a solder trough 5' about the margin of the piece 2. A pair of diametrically opposed mounting tabs 6 are integral with, and extend radially outward from, the margins of the piece 2. Each of the tabs 6 is flat and substantially coplanar with the flat portion of the mounting piece 2 to present additional surface areas that may be brought against the sheet 3.

A capacitor unit proper 7, shown in Fig. 3 as a completed element, comprises a dielectric disc 8 and a pair of opposing plates 9. The dielectric disc 8 is preferably formed of a ceramic material selected from the titanate materials as are employed in so-called ceramic capacitors. The material of the disc 8 may also be composed of other dielectric materials which meet the requirements of the use to which the capacitor assembly 1 is to be put. The opposing plates 9 are thin coatings of silver paste bonded to the surfaces of the disc 8 and the completed capacitor unit 7 is a flat disc to present a minimum of reactance at high frequencies.

The capacitor unit 7 has a central opening aligned with the central opening of the neck 4 of the mounting piece 2, and is attached by a solder film 10 to the area of the mounting piece 2 within raised projection of the ridge 5. The solder 10 is shown in Fig. 3 as a preformed ring before attachment of the unit 7 with the piece 2. To facilitate attachment the ridge 5 acts as a guide to locate the unit 7, whereby the central openings of the piece 2 and unit 7 are properly aligned.

Extending through the capacitor unit 7 and the mounting piece 2 is the shank of an elongated conductor 11. As shown in Figs. 1 and 2, the ends 11' of the conductor 11 are hook shaped to facilitate electrical connection with leads of a circuit network. The forming of the hooked ends 11' is the last operation in the construction of the capacitor assembly 1. Up to the last operation, the ends 11' are plain to permit several elements to be placed over the conductor 11. A radially extending collar 12 forms an integral part of the conductor 11 and is adhered with an electrical connection, by means of solder 13, to the plate 9 of the capacitor unit 7 opposite the plate joined to the mounting piece 2. In Fig. 3 the solder 13 is also shown as a preformed ring prior to assembly.

A cup shaped protective shell 14 of a hard insulating material covers the capacitor unit 7 and the collar 12 of the conductor 11. The open end of the shell 14 is defined by an edge 15, abutting the ridge 5, and the conductor 11 extends through a central opening 16 in the opposite end of the shell 14. The cup shape of the shell 14 is of a depth whereby the portion of the shell 14, at the opening 16, which closely encircles the conductor 11 is a substantial longitudinal distance along the conductor 11 from the solder 13. This substantial extent along the conductor 11 is provided to strengthen the construction in a manner to be described. The protective shell 14 is formed from a hard rigid material which has a high dielectric strength to insulate portions of the assembly 1 from other circuit components, and a ceramic material composed of steatite has been employed for this purpose.

Surrounding a portion of the conductor 11 extending from the side of the capacitor unit 7 opposite that covered by the shell 14 is an insulating sleeve 17 seated within the collar 4 of the mounting piece 2. The sleeve 17 is also of a hard rigid material that lends rigidity to the construction, and a steatite ceramic is also well adapted for this element.

Filling interior space of the cup shaped shell 14, and also space between the sleeve 17 and the conductor 11 and collar 4, is a heat hardened intermediate bedding material 18. The material 18 unites the shell 14 and the sleeve 17 with the other elements of the capacitor assembly 1 to present a composite structure exhibiting a high degree of strength and rigidity. The capacitor unit 7 is fully embedded, except for the connections with the conductive elements 2 and 11, within the composite protective insulating cover presented by the material 18 and the elements 14, 17. It is consequently desirable to have a bedding material 18 that is impervious to moisture and which may withstand high ambient temperatures without deterioration, to complement the shell 14 and sleeve 17, thereby providing a capacitor assembly 1 that may be subjected to severe adverse conditions. It is also desirable to have a bedding material 18 that has a high dielectric strength to ensure adequate insulation.

To unite the shell 14 and the sleeve 17 with the other elements of the apparatus the bedding material 18 undergoes a transformation from a liquid to a solid state, in which it bonds with the surfaces wetted thereby. Thus, the material 18 should have an excellent wetting characteristic, when liquid, and it should have a small shrinkage factor, so that upon hardening voids are eliminated and excessive internal stresses are not created. It has been found that epoxy resin exhibits desirable characteristics making the assembly possible.

The epoxy resin may be prepared by heating in admixture with a hardening agent and advancing the liquid to a point short of final cure, at which point any substantial continuance of heating will induce a solid state. The mixture is then permitted to cool and harden. After hardening it is granulated into particles of controlled size, and these particles are then preformed into wafers that are adapted to fit between the protective shell 14 and the capacitor unit 7, and also within the neck 4 between the inner end of the sleeve 17 and the side of the capacitor unit 7 adhered to the mounting piece 2. With such wafers in place a final cure is made by application of heat in which the epoxy first becomes a liquid of high viscosity with excellent wetting characteristics, and then a solid uniting the structural elements.

The protective insulating covering comprising the ceramic parts 14, 17 and the intermediate bedding layer 18 renders the completed capacitor assembly 1 both rugged and sturdy to withstand abusive handling. This covering has a substantial dimension longitudinal of the conductor 11, and is firmly united therewith to form a composite assembly that ensures retention of the conductor 11 in a fixed position with respect to the capacitor unit 7. The longitudinal extent of both the shell 14 and the sleeve 17 along the conductor 11 permits the adhesive bedding material 18 to unite with the conductor 11 over a substantial portion of its length. Rigidity is thereby attained, and as a result, both thermal shock and physical impact are withstood without injury to the assembly 1.

To facilitate the attachment of the completed capacitor assembly 1 to a sheet 3, which in Fig. 2 represents a portion of a shielding or chassis member, the tabs 6 are fully exposed radially beyond the outermost extent of the shell 14. One side of each tab 6 is brought against the sheet 3 by inserting the capacitor assembly 1 through an opening 19 in the sheet 3. Upon the tabs 6, and portions of the mounting piece 2, including the solder trough 5' provided by the ridge 5, being placed against the surface of the sheet 3 a hot soldering iron 20 is brought to bear upon the opposite sides of the tabs 6, as is illustrated in Fig. 2. The exposed tabs 6 are readily engaged by the tip of the soldering iron 20 to receive and conduct heat for introducing the same to areas of the piece 2 and sheet 3 that are to receive the solder. The solder may be introduced in the manner desired, and due to the ready conduction of heat and the ease of handling the solder operation will be completed in a minimum of time. The handling of the iron 20 and the capacitor assembly 1 is facilitated by the exposure of the heat receiving tabs 6, and therefore the use of capacitors as herein described increases economy in assembly line production.

We claim:

1. A capacitor assembly comprising a capacitor unit having a dielectric disc with electrically conductive plates on opposite sides thereof; a conductive mounting member secured mechanically to said unit and connected electrically with one of said plates, said mounting member having a heat conductive tab extending therefrom adapted to accept soldering heat when contacted by a hot iron and including a solder trough formed therein at the side opposite said unit and arranged to define the inner margin of said tab; a conductor electrically connected to the other of said plates; a protective shell of hard electrically insulating material encircling said conductor and said capacitor unit and extending a substantial length along the conductor, said shell abutting said mounting member to enclose the capacitor unit within the mounting member and the shell with the tab exposed radially outside the shell; and an electrically insulating adhesive bedding material filling space between the shell, the conductor, and the capacitor unit which unites the shell with the capacitor unit and the conductor.

2. A capacitor assembly in accordance with claim 1 in which said bedding material consists of a heat hardened epoxy resin.

3. A capacitor assembly comprising a capacitor unit having a dielectric disc with electrically conductive plates on opposite sides thereof and a central opening; a substantially flat conductive mounting member with an opening aligned with that of said capacitor unit secured mechanically to said unit and connected electrically with one of said plates, said member having margin areas radially outward of the capacitor unit with a heat conductive tab extending radially from the margin areas and including a solder trough formed therein at the side opposite said unit and arranged to define the inner margin of said tab; a conductor extending through said openings electrically connected with the plate of said capacitor unit opposite that connected to said mounting member; a ceramic shell encircling said capacitor unit and said conductor abutting margin areas of said mounting member to form therewith a covering for said capacitor unit, said shell being radially within said tab; and an electrically insulating adhesive bedding material filling space between the shell and the capacitor unit uniting the shell, unit, conductor and mounting member with one another.

4. A capacitor assembly comprising a sheet metal mounting portion with a flat central area, said mounting portion being formed to provide a ridge at one side thereof and a shallow solder trough in substantial register with said ridge at the opposite side thereof, which ridge and trough are formed in the sheet metal along the periphery of the flat central area, and a mounting tab extending laterally of the outside of the trough which is separated from the flat central area by the solder trough; a flat capacitor unit having a dielectric wafer with a capacitor plate on each side, one of said capacitor plates being attached to the flat central area of said mounting portion and lying within said ridge; a conductor electrically connected to the other capacitor plate of said capacitor unit; and a protective insulating covering encasing the capacitor unit and a portion of the conductor lending rigidity to the assembly which comprises a hard insulating outer shell and an insulating adhesive filling the space between the shell, conductor and capacitor unit.

5. A capacitor assembly comprising a sheet metal mounting portion with a flat central area and a mounting tab extending radially from the flat central area that is substantially parallel thereto, said sheet metal mounting portion including a solder trough formed therein and arranged to define the divisional margin between said tab and said flat central area; a flat capacitor unit disposed radially within said trough having a dielectric wafer with a capacitor plate on each side, one of said capacitor plates being attached to the flat central area of said mounting portion at the side opposite said trough; a conductor electrically connected to the other capacitor plate of said capacitor unit which extends substantially perpendicular from the capacitor unit; and a protective insulating covering encasing the capacitor unit and a portion of the conductor which covering includes a ceramic shell that abuts the sheet metal mounting portion radially to the outside of the periphery of the capacitor unit and radially within the mounting tab to leave the tab exposed for engagement by a solder iron and a resinous adhesive filling the space between the shell, capacitor unit and conductor.

References Cited in the file of this patent

UNITED STATES PATENTS

| | | |
|---|---|---|
| 2,566,759 | Clark | Sept. 4, 1951 |
| 2,706,798 | Kodama | Apr. 19, 1955 |
| 2,756,375 | Peck | July 24, 1956 |